March 1, 1927.

A. F. SANFORD 1,619,545

RADIO APPARATUS

Original Filed Sept. 23 1925    5 Sheets-Sheet 1

March 1, 1927.
A. F. SANFORD
1,619,545
RADIO APPARATUS
Original Filed Sept. 23 1925　5 Sheets-Sheet 3
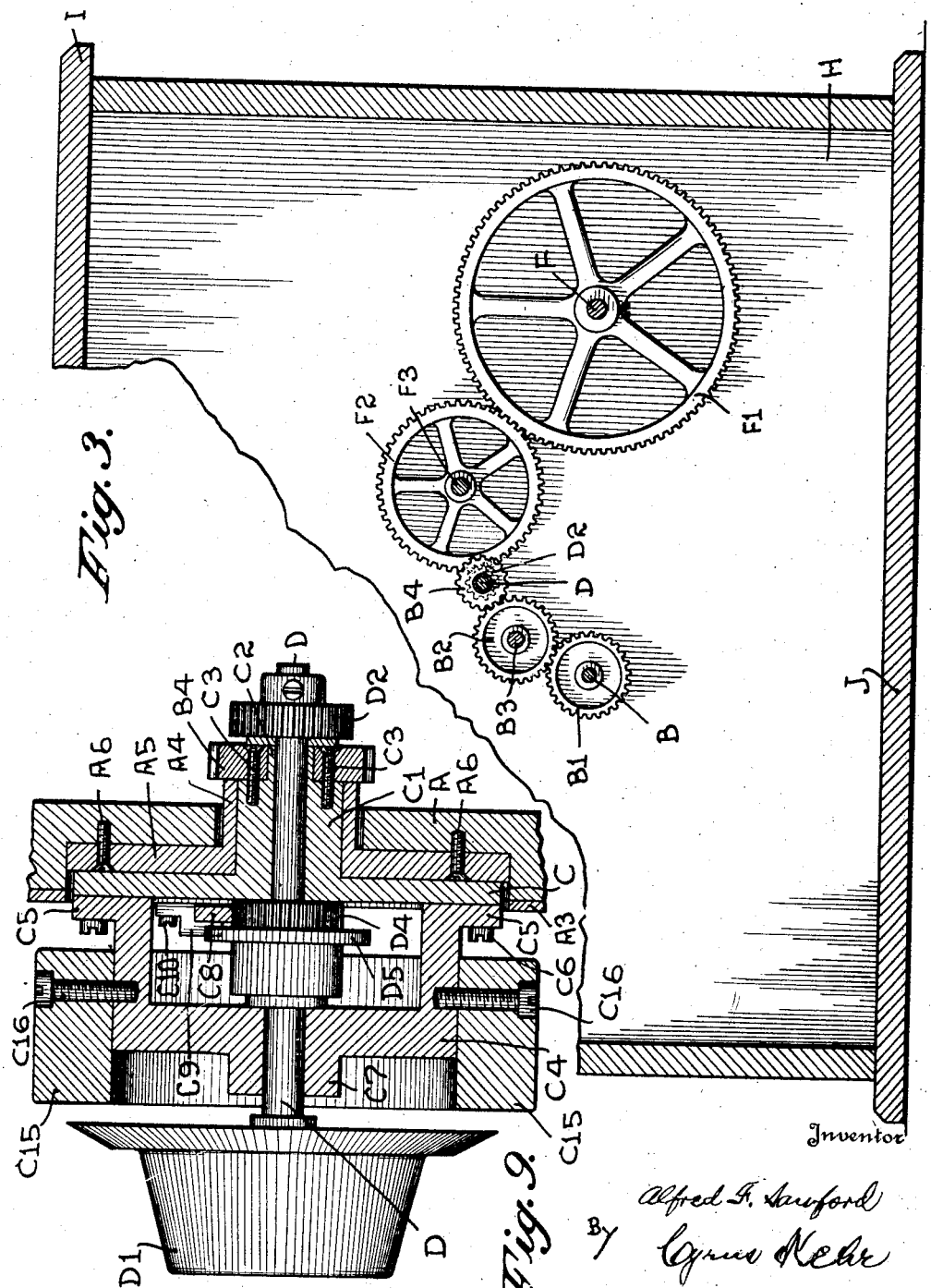

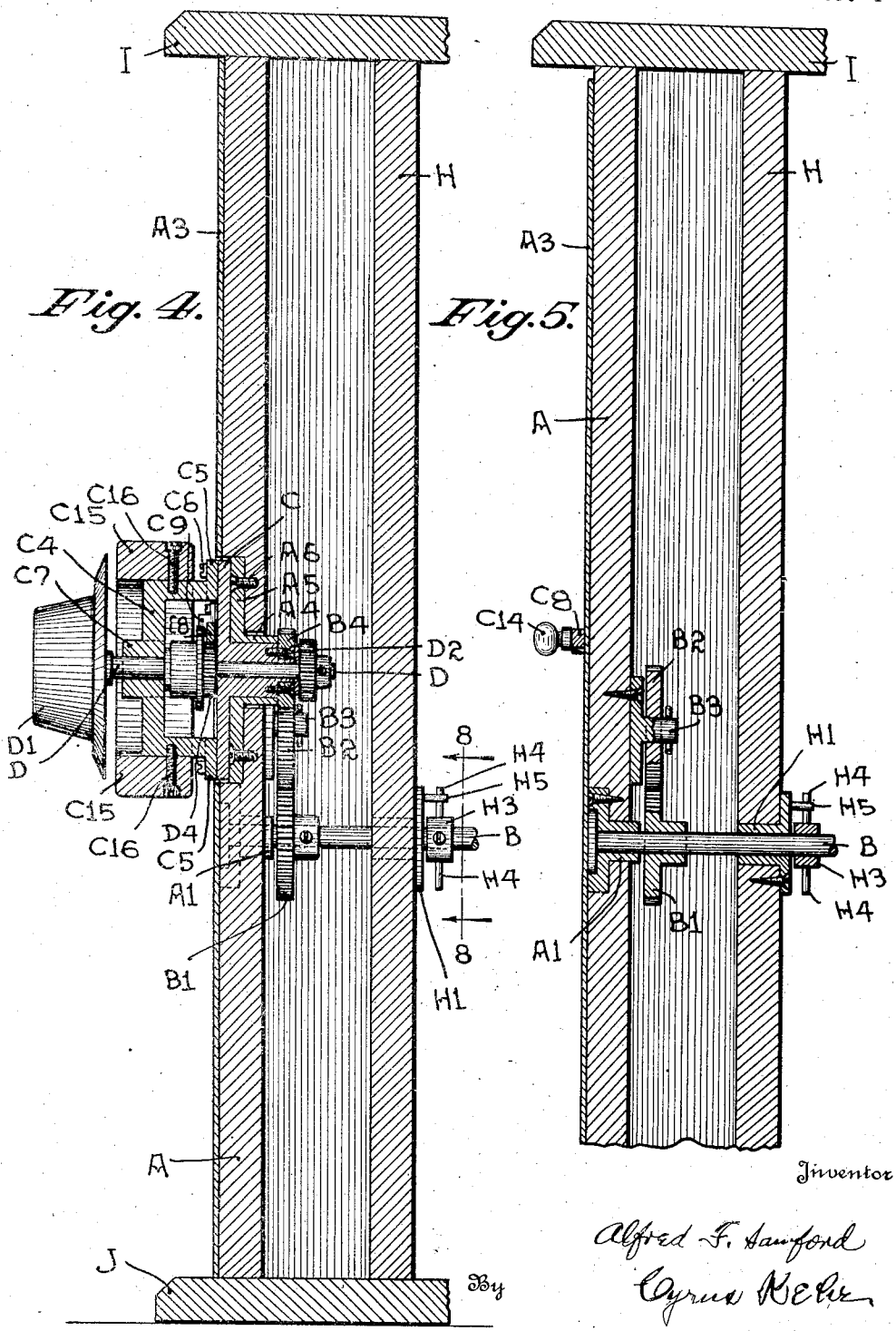

March 1, 1927.  A. F. SANFORD  1,619,545
RADIO APPARATUS
Original Filed Sept. 23 1925   5 Sheets-Sheet 5
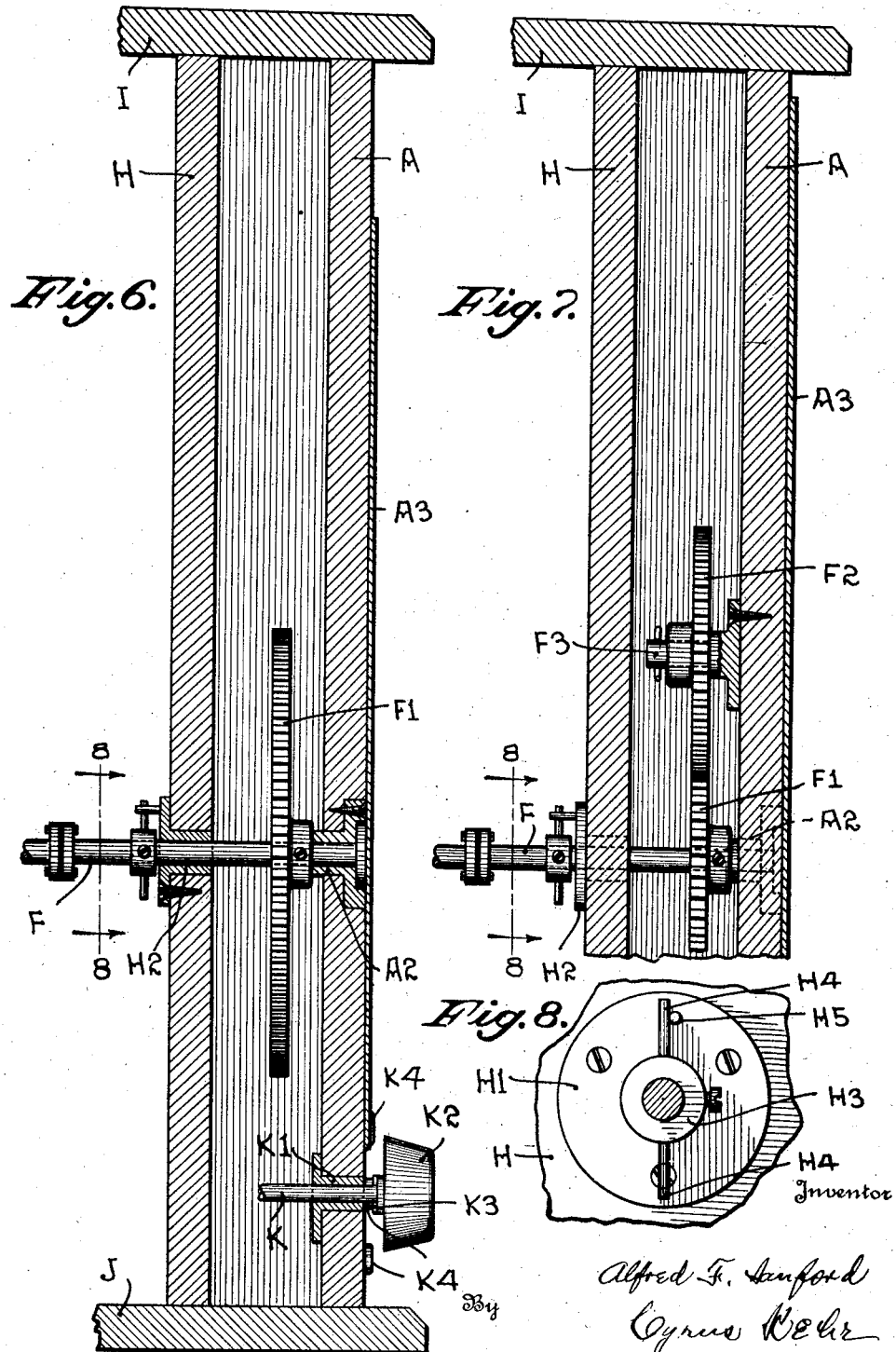

Patented Mar. 1, 1927.

1,619,545

UNITED STATES PATENT OFFICE.

ALFRED F. SANFORD, OF KNOXVILLE, TENNESSEE.

RADIO APPARATUS.

Application filed September 23, 1925, Serial No. 58,154. Renewed October 7, 1926.

This invention relates generally to radio-receiving apparatus and particularly to mechanism used for bringing the receiving apparatus into tune with sending stations. This apparatus includes means for guiding the operator in making records of the positions of members of the apparatus after the apparatus has been brought into tune with a chosen sending station, in order that thereafter such records may be used as a guide for again adjusting the apparatus to again bring it into tune with the sending apparatus to which the record relates.

The object of the invention is to produce in convenient and efficient form the receiving mechanism adapted to function in this manner.

The drawing shows my invention applied to a two-factor radio-receiving set.

In the accompanying drawings,

Fig. 3 is an upright section immediately at the rear of the front wall;

Fig. 4 is an upright section on the line, 4—4, of Figs. 1 and 2, looking toward the left;

Fig. 5 is an upright section on the line, 5—5, of Fig. 2, looking toward the left;

Fig. 6 is an upright section on the line, 6—6, of Fig. 2, looking toward the right;

Fig. 7 is an upright section on the line, 7—7, of Fig. 2, looking toward the right;

Fig. 8 is an upright section on the line, 8—8, of Figs. 4, 6 and 7, looking in the direction of the arrows;

Fig. 9 is an enlargement of the main bearing shown in Fig. 4.

Figure 1:
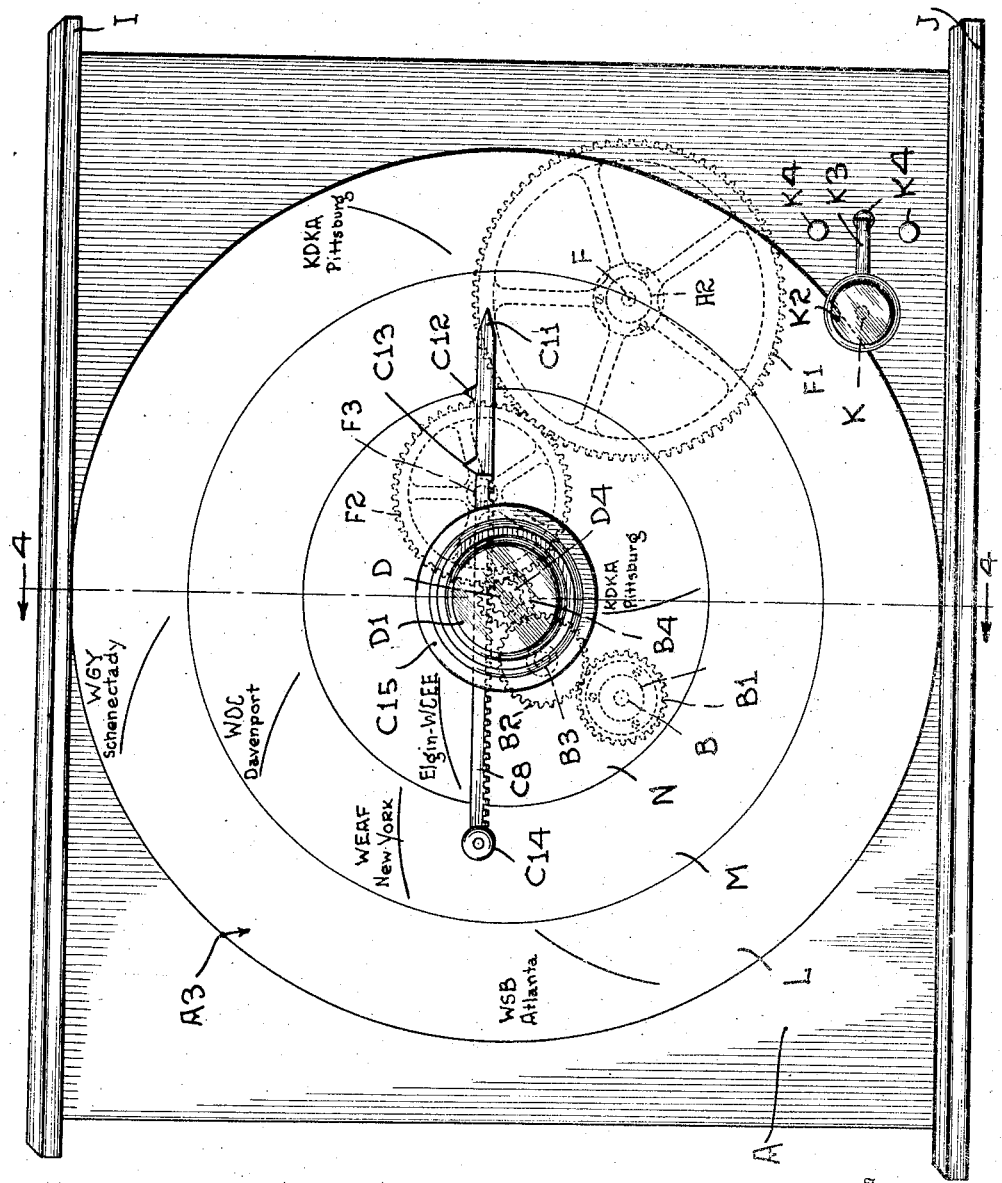
Fig. 1 is a front elevation of a radio receiving set embodying my invention.
Figure 2:
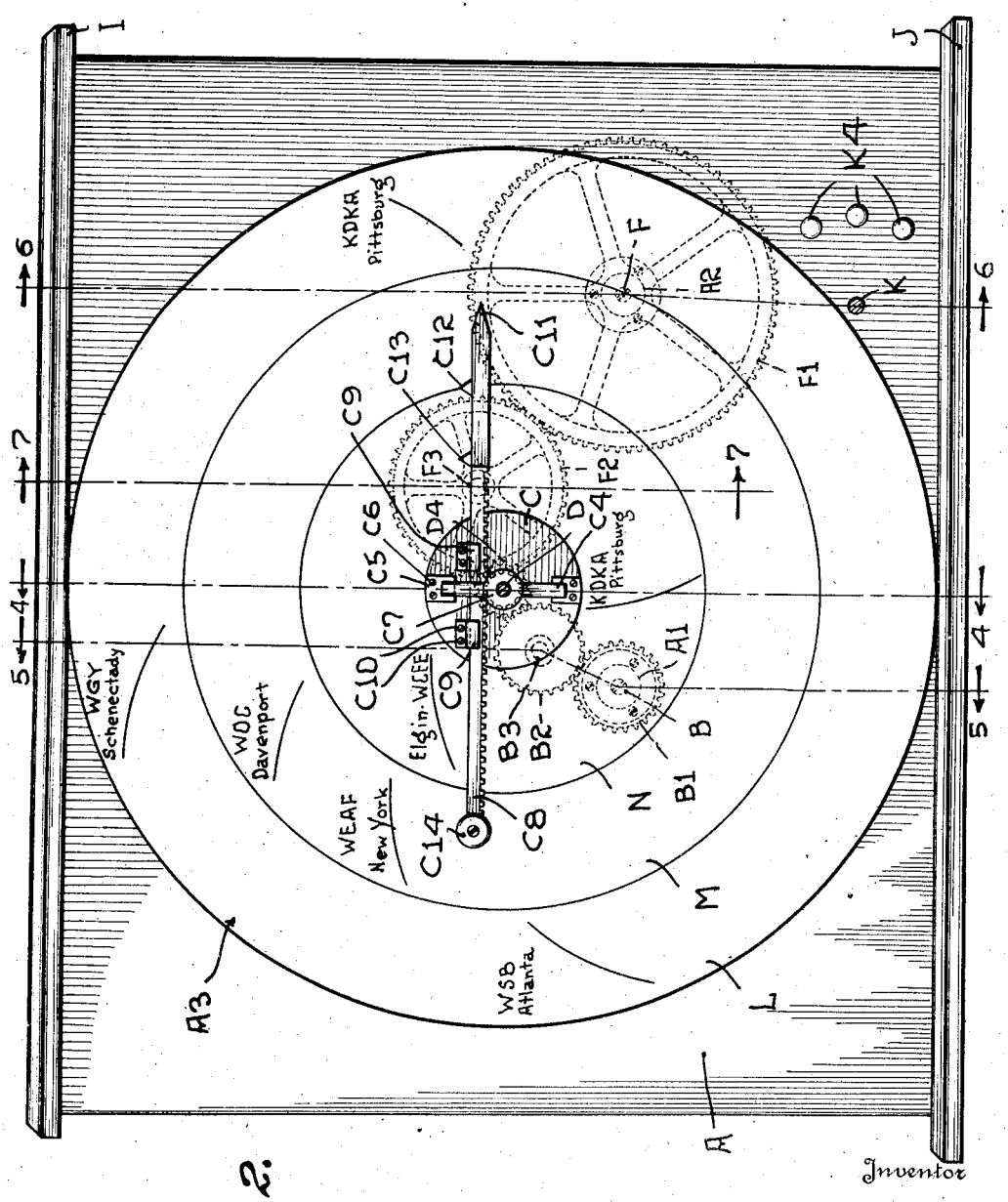
Fig. 2 is a similar elevation, parts of the mechanism being omitted.

Referring to said drawings, A is the front upright wall of a casing or cabinet forming a part of the radio set. H is an inner wall near and parallel to the front wall. I is the top wall. J is the base.

$A^1$ is a bearing in the wall, A. In horizontal alignment with that bearing is a bearing, $H^1$, in the wall, H. The first tuning shaft, B, rests in said bearings and extends rearward beyond the bearing, $H^1$.

In the front wall and in the horizontal plane of the bearings, $A^1$ and $H^1$, is a bearing, $A^2$, and in the wall, H, in horizontal alignment with said bearing is a bearing, $H^2$. The second tuning shaft, F, rests in said bearings and extends rearward of the bearing, $H^2$.

At the rear of the bearing, $H^1$, a collar, $H^3$, surrounds and is fixed to the shaft, B, and bears two diametrically opposite radial pins, $H^4$. On the bearing, $H^1$, is a horizontal pin, $H^5$, extending rearward into the path of the pins, $H^4$. When the shaft, B, is being turned, that movement is arrested when one of the pins, $H^4$, meets the pin, $H^5$. Since the pins, $H^4$, are diametrically opposite each other, only a one-half turn of said shaft is permitted. (See Figs. 4, 5 and 8.) A duplicate of this mechanism is applied to the second tuning shaft, $F^1$, and the bearing, $H^2$. This provision for controlling or limiting the turning of these tuning shafts is made because some of the tuning mechanism now in general use requires only a one-half turn of the tuning mechanism which is connected with the tuning shafts.

A bearing, $A^4$, is seated in and extended through the wall, A, and has at its front an upright, circular flange, $A^5$, which is countersunk in the wall, A, and secured to said wall by means of screws, $A^6$. A circular sheet of paper or similar material, $A^3$, is applied to the front face of the wall, A. A turntable, C, has a cylindrical neck, $C^1$, seated rotatably in the bearing, $A^4$, and having its rear end flush with the rear end of the bearing, $A^4$. The turntable rests flatwise against the flange, $A^5$, of the bearing, $A^4$. The neck, $C^1$, has a small cylindrical extension, $C^2$, around which extends a small spur gear wheel, $B^4$. That wheel is secured to the neck, $C^1$, by means of screws, $C^3$. The wheel, $B^4$, meshes with an idle spur gear wheel, $B^2$, which is rotatable on the shaft, $B^3$, which is fixed on the rear face of the wall, A. The wheel, $B^2$, meshes with the spur gear wheel, $B^1$, which surrounds and is fixed to the shaft, B.

Now it will be seen that when the turntable, C, is turned, the train of gears intervening between the neck, $C^1$, of the turntable and the shaft, B, will cause the turning of the shaft, B. The wheels, $B^1$ and $B^3$, have twice the number of teeth that the wheel, $B^4$, has. Hence the wheel, $B^4$, and the turntable will make a complete turn while the shaft, B, makes the one-half turn to which it is limited, as above described.

On the turntable is a yoke, $C^4$, which has two feet, $C^5$, which rest against the flat outer face of the turntable and are secured thereto by means of screws, $C^6$, extending through said feet and into the turntable. On said yoke is a horizontal bearing, $C^7$, on the axial line of the neck, $C^1$, of the turntable. A shaft, D, extends through said bearing and rearward through the neck, $C^1$, of the turntable and is rotatable in said bearing and in said neck. On the outer or front end of the shaft, D, is fixed a hand knob, $D^1$, by means of which said shaft may be turned. A small spur gear wheel, $D^2$, surrounds and is fixed to the rear end of the shaft, D, and is separated from the spur gear wheel, $B^4$, by means of a washer, $D^3$.

Fixed on the shaft, D, immediately at the front of the turntable is a spur gear wheel, $D^4$. Integral with said wheel and at the front thereof is an annular flange, $D^5$. A rack bar, $C^8$, is placed parallel to the front face of the wall, A, and meshes with the spur gear wheel, $D^4$. At the opposite side of the rack bar, guide brackets, $C^9$, rest on the outer face of the turntable and extend over the front face of the rack bar and are secured to the turntable by means of screws, $C^{10}$. Said brackets and the spur gear wheel, $D^2$, confine the rack bar to endwise sliding movement relative to the turntable. But since the brackets are mounted on the turntable and revolve around the axial line of the turntable when said table is turned, it must follow that the rack bar will tilt or turn around the axial line of the turntable when the table is turned. One end of the rack bar is in the form of a point, $C^{11}$. Near said point a tooth, $C^{12}$, extends laterally from the edge of the rack bar which is opposite the rack bar teeth. Between the tooth, $C^{12}$, and the turntable is another similarly located tooth, $C^{13}$. On the opposite end of the rack bar is a handle, $C^{14}$.

A ring-form hand knob, $C^{15}$, surrounds the yoke, $C^4$, and is secured thereto by means of screws, $C^{16}$. By turning this hand knob, the turntable is turned, and thereby the pointer end or point, $C^{11}$, of the rack bar is made to sweep across the outer face of the wall, A, without endwise movement. Endwise movement of the rack bar on the turntable is effected in connection with the turning of the second tuning shaft, F.

A spur gear wheel, $F^1$, surrounds and is fixed to the second tuning shaft, F, and meshes with an idle spur gear wheel, $F^2$, which surrounds and is rotatable on the shaft, $F^3$, which is fixed on the front wall, A. This idle wheel meshes with the small spur gear wheel, $D^2$, already described as being fixed on the inner end of the shaft, D. Turning the shaft, D, by turning the hand knob, $D^1$, will cause transmission of motion through the gear wheels, $D^2$, $F^2$ and $F^1$, to the tuning shaft, F. At the same time the spur gear wheel, $D^4$, on the shaft, D, is turned and causes the endwise movement of the rack bar. These three gear wheels and the gear wheel, $D^4$, and the rack bar, $C^8$, are so proportioned as to cause the tuning shaft, F, to make a one-half turn while the rack bar is carried through desired range of endwise movement.

The rack bar has the character and function of a pointer. The point, $C^{11}$, is used for locating the markings on the outer zone, L, of the recording surface, $A^3$. The teeth, $C^{12}$ and $C^{13}$, may be used for locating markings on the zones, M and N, respectively. The different zones may be used to indicate sending stations operating on different wave lengths.

Attention is called to the fact that the gear wheels connecting the shaft, D, and the turntable, C, with their tuning shafts are all behind the front wall, A, where they are not seen and where they leave the outer face of the front wall clear to allow full sweep of the rack bar across that face.

It will be observed that the turntable, C, and the shaft, D, may be turned simultaneously, whereby the pointer bar is simultaneously turned on the turntable axis and also moved endwise. In other words, the rack bar or pointer bar is given simultaneously a movement in relation to one tuning shaft and another movement in relation with the other tuning shaft. Thus the outer end of the pointer is carried diagonally instead of radially to the turntable axis or concentrically to said axis.

When the two tuning shafts have been positioned to bring their tuning mechanism into tune with the chosen sending station, the points, $C^{11}$, or one of the teeth, $C^{12}$ or $C^{13}$, is marked on the record-receiving surface and with that mark is placed the symbol or name of that sending station, together with the wave length of that station and any other desired data. Thereafter this receiving mechanism may be again brought into tune with the same sending station by again bringing the rack bar into position indicated by the marking.

It is well known that, in receiving sets of what is known as the regenerative type, a given wave length or sending station signal may be received on a variety of combinations of settings of the two principal tuning members, and when this apparatus is applied to such a regenerative set, the points on the rack bar, $C^8$, will describe a curve corresponding to all of the different combinations of the two tuning members at which a certain wave length will be received. Therefore, in such cases, this curve line would be recorded, from experience, on the face of the recording surface, as illustrated in Fig. 1. When the pointer rests on any part of this curved line, the set will be in tune for the recorded station and the operator can find the best tuning combination for that station at the time of receiving by moving the pointer along this curve line and stopping where the best results are secured.

In a set not of the regenerative type where two principal tuning members are used and where fixed combinations of settings of the two tuning members are necessary for the reception of any given wave length, this combination of settings would be indicated by a dot at the end of the pointer only on the face of the record-receiving surface instead of by a curved line. The three different zones, L, M and N, shown on the recording surface may be used with the three different points on the rack bar where three different settings of an additional wave length control switch, K, is also used in connection with the tuning member. The three different zones correspond, respectively, to three different points, K⁴, of the switch. The number of these zones may be increased or reduced according to the nature of the construction of the radio-receiving set. And the zones and the pointers on the rack bar and the switch points of the additional wave length control switch should all bear appropriate relation during operation.

I claim as my invention,

1. In a radio-receiving mechanism, the combination of a wall having a record-receiving surface, two shafts to be turned for tuning, a pointer bar, and means located at the rear of said wall in operative relation with said pointer and with said shafts whereby rotation of one of said shafts and movement of the pointer bar in one direction are simultaneous and whereby rotation of the other shaft and movement of the pointer in another direction are simultaneous, substantially as described.

2. In a radio-receiving mechanism, the combination of a wall having a record-receiving surface, two shafts to be turned for tuning, a pointer bar, and means located behind said wall and in operative relation with said pointer bar and with said shafts whereby rotation of one of said shafts and movement of the pointer in one direction are simultaneous and whereby rotation of the other shaft and movement of the pointer in another direction are simultaneous, and whereby said four movements may be effected simultaneously, the movement of the pointer becoming a resultant of the movement associated with the one shaft and the movement associated with the other shaft, substantially as described.

3. In a radio-receiving mechanism, the combination of a wall having a record-receiving surface, two shafts concerned with tuning, a pointer bar located at the front of said wall and serving as a pointer and being in operative relation with one of said shafts for tilting with the turning of said shaft, and means located at the back of said wall and in operative relation with said pointer bar and the other shaft for transmission of motion between the pointer bar and the other shaft; substantially as described.

4. In a radio-receiving mechanism, the combination of a wall having a record-receiving surface, two tuning shafts, two rotatable members extending through said wall, gearing connecting the inner end of one of said rotatable members and one of the tuning shafts, gearing connecting the inner end of the other rotatable member and the other tuning shaft, a rack bar supported on one of the rotatable members for rotation therewith and to permit endwise movement thereon, and means on the other rotatable member in operative relation with said bar for moving said bar endwise, substantially as described.

5. In a radio-receiving mechanism, the combination of a wall having a record-receiving surface, two tuning shafts, two rotatable members on a common axial line and extending through said wall, gearing connecting the innner end of one of said rotatable members and one of the tuning shafts, gearing connecting the inner end of the other rotatable member and the other tuning shaft, a rack bar supported on one of the rotatable members for rotation therewith and to permit endwise movement thereon, and means on the other rotatable member in operative relation with said bar for moving said bar endwise, substantially as described.

6. In a radio-receiving mechanism, the combination of a wall having a record-receiving surface, two tuning shafts, two rotatable members on a common axial line and extending through said wall, gearing connecting one of said rotatable members and one of the tuning shafts, gearing connecting the other rotatable member and the other tuning shaft, a rack bar supported on one of the rotatable members for rotation therewith and to permit endwise movement thereon, and means on the other rotatable member in operative relation with said bar for moving said bar endwise, substantially as described.

7. In a radio-receiving mechanism, the combination of a wall having a record-receiving surface, two tuning shafts, two rotatable members extending through said wall, gearing connecting the inner end of one of said rotatable members and one of the tuning shafts, gearing connecting the inner end of the other rotatable member and the other tuning shaft, a pointer bar supported on one of the rotatable members for rotation therewith and to permit endwise movement thereon, and means on the other rotatable member in operative relation with said bar for moving said bar endwise, substantially as described.

8. In a radio-receiving mechanism, the combination of a wall having a record-receiving surface, two tuning shafts, two rotatable members on a common axial line and extending through said wall, gearing connecting the inner end of one of said rotatable members and one of the tuning shafts, gearing connecting the inner end of the other rotatable member and the other tuning shaft, a pointer bar supported on one of the rotatable members for rotation therewith and to permit endwise movement thereon, and means on the other rotatable member in operative relation with said bar for moving said bar endwise, substantially as described.

9. In a radio-receiving mechanism, the combination of a wall having a record-receiving surface, two tuning shafts, two rotatable members on a common axial line and extending through said wall, gearing connecting one of said rotatable members and one of the tuning shafts, gearing connecting the other rotatable member and the other tuning shaft, a pointer bar supported on one of the rotatable members for rotation therewith and to permit endwise movement thereon, and means on the other rotatable member in operative relation with said bar for moving said bar endwise, substantially as described.

10. In a radio-receiving mechanism, the combination of a wall having a record-receiving surface, two tuning shafts, a turntable rotatable on an axis which is perpendicular to the record-receiving surface and extends through said surface, gearing connecting said turntable with one of the tuning shafts, a shaft rotatably seated on the axial line of the turntable, gearing connecting said shaft and the other tuning shaft, a gear wheel surrounding and fixed on the turntable shaft, a rack bar parallel to the record-receiving surface and meshing with said gear wheel, means on the turntable for holding the rack bar in mesh with said wheel and permitting endwise movement of the rack bar on the turntable and over the record-receiving surface, substantially as described.

11. In a radio receiving mechanism, the combination of two tuning shafts, a first rotatable member, means placing said member into operative relation with one of said tuning shafts for simultaneous turning of said member and said shaft, a pointer bar supported on said rotatable member for turning with said member for endwise reciprocation of said bar, a second rotatable member in axial alignment with the first rotatable member and in operative relation with the pointer bar for moving said bar endwise, and means in operative relation with said second rotatable member and the other tuning shaft to provide for turning of the second tuning shaft and the second rotatable member in unison, substantially as described.

12. In a radio receiving mechanism, the combination of two tuning shafts, a first rotatable member, means placing said member into operative relation with one of said tuning shafts for simultaneous turning of said member and said shaft, a pointer bar supported on said rotatable member for turning with said member for endwise reciprocation of said bar, a second rotatable member extending through the first rotatable member and in operative relation with the pointer bar for moving said bar endwise, and means in operative relation with said second rotatable member and the other tuning shaft to provide for turning of the second tuning shaft and the second rotatable member in unison, substantially as described.

13. In a radio receiving mechanism, the combination of two tuning shafts, two rotatable members each bearing a hand operated member, said hand operated members being positioned to be grasped by the one hand for simultaneous turning of said rotatable members, means placing one of said rotatable members in operative relation with one of said tuning shafts for simultaneous turning of said rotatable member and said tuning shaft and means placing the second rotatable member in operative relation with the other tuning shaft for simultaneous turning of said second rotatable member and said second tuning shaft, substantially as described.

14. In a radio receiving mechanism, the combination of two tuning shafts, two rotatable members each bearing a hand operated member, said hand operated members being positioned to be grasped by the one hand for simultaneous turning of said rotatable members, means placing one of said rotatable members in operative relation with one of said tuning shafts for simultaneous turning of said rotatable member and said tuning shaft and means placing the second rotatable member in operative relation with the other tuning shaft for simultaneous turning of said second rotatable member and said second tuning shaft, the turning of the second tuning shaft being at a slower velocity than the turning of the second rotatable member, and position indicating means associated with said second rotatable member, substantially as described.

15. In a radio receiving mechanism, the combination of two shafts to be turned for tuning, a pointer bar having a plurality of points, means in operative relation with said pointer bar and with said shafts whereby turning one of said shafts and movement of the pointer bar in endwise direction are simultaneous and whereby turning of the other shaft and movement of the pointer in sidewise direction are simultaneous, and a member bearing a record surface divided into a plurality of zones concentric with the shaft by which the pointer bar is given sidewise movement, substantially as described.

16. In a radio receiving mechanism, the combination of two tuning shafts, a third shaft in operative relation with one of the tuning shafts for simultaneous turning, the third shaft being adapted to make approximately a full rotation during a one-half rotation of said tuning shaft, a plural pointer bar mounted on said third shaft for turning with said shaft and to permit endwise movement, means in operative relation with the second tuning shaft and said pointer bar for imparting endwise movement to the pointer bar during turning of said tuning shaft, and a member bearing a record surface divided into a plurality of zones approximately concentric with the axis of said third shaft, substantially as described.

In testimony whereof I have signed my name, this 4th day of September, in the year one thousand nine hundred and twenty-five.

ALFRED F. SANFORD.